Patented Feb. 7, 1928.

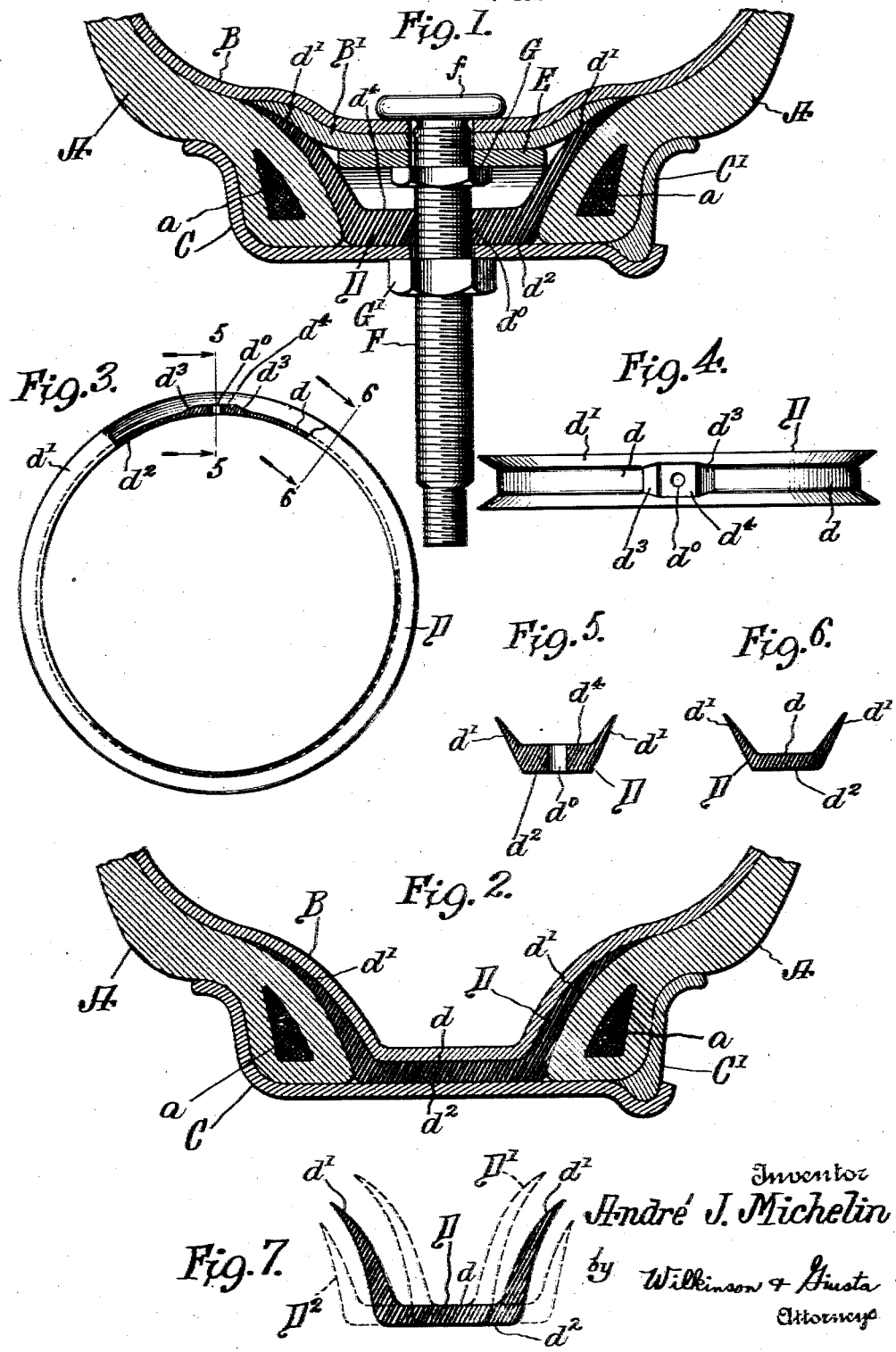

1,658,646

UNITED STATES PATENT OFFICE.

ANDRÉ JULES MICHELIN, OF PARIS, FRANCE, ASSIGNOR TO MICHELIN ET CIE., OF CLERMONT-FERRAND, FRANCE, A CORPORATION OF FRANCE.

FLAP FOR TIRES.

Application filed November 10, 1927, Serial No. 232,335, and in France November 13, 1926.

My present invention relates to improvements in tire flaps and is intended to cover a modification of, an improvement in the structure illustrated and described in the U. S. Patents to Jules Hauvette-Michelin for tire flaps granted respectively March 2, 1926, and June 15, 1926, and numbered respectively 1,557,479 and 1,589,301.

In these and other patents for devices used for protecting the inner tube against abrasion either from the tire cover or from the rusty portion on the cylindrical outer face of the rim, it has been found expedient to use a band containing textile fabric or to use a flat rubber band, or to use a rubber band substantially V-shaped in cross section, but none of the arrangements referred to are believed to be specially adapted for use with various widths of rims, and the herein described protecting flap is believed to possess certain advantages as to efficiency and adaptability as will be more fully understood after reference to the accompanying drawings.

In the drawings, like parts are indicated by similar reference symbols throughout the several views.

Figure 1 shows a cross section through the beads of a tire, and the rim, flap and inner tube, in the region of the valve stem, parts being shown in elevation.

Figure 2 shows a similar view through the beads of the tire casing, the inner tube, flap and rim, at point distant from the valve stem.

Figure 3 is a detail showing in side elevation tire flap removed from the rim, parts being broken away.

Figure 4 is a plan view of the tire flap shown in Figure 3.

Figure 5 shows a cross section of the tire flap shown in Figures 3 and 4, along the line 5—5 of Figure 3, and looking in the direction of the arrows.

Figure 6 shows a section along the line 6—6 of the tire flap shown in Figure 3, and looking in the direction of the arrows, and Figure 7 is a cross sectional diagrammatic view showing the adaptability of the tire flap to use with various widths of rim.

A is the tire casing provided with any suitable reinforce, such as the wire $a$ in the beads thereof.

B represents the inner tube which is preferably provided in the region of the valve stem with the reinforcing the patch $B^1$ vulcanized thereon in the usual way.

C represents the rim which is shown of the straight side type, and is provided on one side with the locking ring $C^1$. Any suitable form of rim may be provided such not being a part of my present invention, which relates more especially to the flap D. This is in the form of a channeled ring which is continuous throughout and is preferably made of vulcanized rubber without any reinforce of cloth, fabric, or the like.

This ring is shown in detail in Figures 3 to 6 and it consists of a channeled band, in cross section in the form of a truncated V. The inner wall of which is substantially cylindrical in shape as $d$ and this cylindrical portion terminates in two side walls $d'$ each flaring outward and tapered as shown most clearly in Figures 5 and 6. The inner wall of the ring D is made cylindrical as $d^2$ to stretch over and fit snugly against the cylindrical portion of the rim C, between the tire beads, as shown in Figures 1 and 2. This ring D may be provided with a reinforced portion adjacent to the hole $d^0$ for the valve stem, such portion being shown at $d^3$ and $d^4$ in Figures 1, 3, 4 and 5. This reinforced portion will protect the flap from being torn by the valve stem as is apt to happen when the flap is forced around the rim C when the wheel is in use on the road, but this reinforced portion may be omitted if desired.

I have shown in Figure 1 a protective metallic bridge E outside of the inner tube in the region of the valve stem which is illustrated and described in the Patents Nos. 1,575,479 and 1,589,301 aforesaid, but this protective bridge may also be omitted, especially, if the flap be reinforced in the region of the valve stem as shown in Figure 4.

The valve stem F is provided with the head $f$ mounted inside of the inner tube, with the clamping nut G, also with the nut G' for holding the valve stem on the rim as is well known in the art.

It will be seen that when the inner tube is inflated as shown in Figure 2, the cylindrical wall $d^2$ of the flap will bear firmly against the outer face of the rim and the inner cylindrical wall $d$ will form a bearing surface for the adjacent portion of the inner tube, while the flaring side walls $d^1$ will adapt themselves to the space between the inner tube and the corresponding portions of the tire cover, thus forming a protective arrangement which will protect the inner tube from unnecessary wear, and at the same time the elasticity of the cylindrical portion of the flap will cause that portion to stretch laterally and force the beads of the tire firmly against the flanges of the rim as shown in Figure 2.

In Figure 7, I have shown a diagram in which the full lines indicate the use of the flap on a rim of medium width, and the dotted lines indicate the use of the same flap on narrow rims and on broad rims respectively, so that the same tire casing, flap and inner tube will serve equally well on rims of varying width.

In assembling the parts, the locking ring C¹ is removed from the side of the rim and that portion of the deflated tire including the inner tube, beads and flap adjacent to the valve stem are slipped over the rim and the valve stem inserted in the usual way; then the rest of the tire is slipped over the rim and the locking ring is put back in place, and the tire is inflated.

The inflation of the inner tube will cause the same to stretch the cylindrical portion of the flap transversely causing the beads of the tire to bear firmly against the flanges of the rim, and at the same time the tapered sides d¹ of the flap will be squeezed firmly into place between the inner tube and the adjacent surface of the tire casing as shown in Figure 2. The elasticity of the cylindrical portion of the tire flap will permit the parts to adapt themselves for use in narrow or broad rims as previously explained with regard to Figure 7.

It will be noted that the amount of friction exerted inside the cover is very small, seeing that the edges of the flap tend to adhere to the inner surface of the cover, and therefore, move only a little or not at all in relation to the said surface, and this further avoids elongation of the tube on the edge of the flap.

The consequence of the combination hereinbefore described being a slower wearing of the flap and cover, easier fitting, and an easy adaptation to the various types of straight side flat rim pneumatic tires at present in use.

While I have shown the improved form of arrangement for tire casing, rim, valve stem and correlated parts, it will be obvious that it might be varied at will without departing from the spirit of my invention, and I do not intend to limit the invention to any such details except as particularly pointed out in the claim.

Having thus described my invention, what I claim and desire to secure by Letters Patent of the United States is:—

A protective flap for tires comprising a continuous channel shaped ring of elastic material cross sectionally in the form of a truncated V, having a cylindrical outer face adapted to engage the outer face of the rim between the beads of the tire and with a substantially cylindrical inner face, and tapering side walls flaring outwardly, and adapted to fit between the adjacent faces of the outer portion of the inner tube and the inner portion of the beads of the tire casing, the said flap being provided with a reinforce integral therewith, said reinforced portion being perforated to permit the passage therethrough of the valve stem.

ANDRÉ JULES MICHELIN.